United States Patent
Hater et al.

Patent Number: 6,066,772
Date of Patent: May 23, 2000

[54] TREATMENT OF TNT-CONTAMINATED SOIL

[75] Inventors: Gary R. Hater, Cincinnati, Ohio; Douglas E. Jerger, Knoxville, Tenn.; Roger B. Green; Paul W. Barnes, both of Cincinnati, Ohio; Patrick M. Woodhull, Van Buren, Ohio

[73] Assignees: Waste Management, Inc., Houston, Tex.; International Technologies Corporation, Knoxville, Tenn.

[21] Appl. No.: 09/143,060

[22] Filed: Aug. 28, 1998

Related U.S. Application Data

[60] Provisional application No. 60/057,598, Aug. 29, 1997.

[51] Int. Cl.[7] .............. A62D 3/00; C05F 11/08; B09B 1/00; B09B 3/00

[52] U.S. Cl. .......... 588/202; 71/6; 71/9; 71/10; 149/124; 405/128; 405/129; 405/264; 435/262.5; 588/203

[58] Field of Search ............ 71/6, 9, 10; 588/202, 588/203; 405/128, 129, 264; 435/262, 262.5; 210/601, 605, 609, 613, 630, 903, 909; 147/108.4, 124

[56] References Cited

U.S. PATENT DOCUMENTS

| | | |
|---|---|---|
| 4,826,601 | 5/1989 | Spratt et al. . |
| 4,919,813 | 4/1990 | Weaver . |
| 4,925,552 | 5/1990 | Bateson et al. . |
| 4,968,427 | 11/1990 | Glasner et al. . |
| 5,062,956 | 11/1991 | Lupton et al. . |
| 5,071,755 | 12/1991 | Nelson et al. . |
| 5,432,088 | 7/1995 | Kakuk et al. . |
| 5,616,162 | 4/1997 | Crawford et al. . |
| 5,618,427 | 4/1997 | Seech et al. . |
| 5,685,891 | 11/1997 | Peltola . |
| 5,688,685 | 11/1997 | Pierce . |
| 5,746,919 | 5/1998 | Dague et al. . |

FOREIGN PATENT DOCUMENTS

| | | |
|---|---|---|
| 4141940 | 12/1993 | Germany . |
| 19643171 | 4/1998 | Germany . |
| WO 91/15440 | 10/1991 | WIPO . |
| WO 95/01311 | 1/1995 | WIPO . |
| WO 95/03259 | 2/1995 | WIPO . |

OTHER PUBLICATIONS

Burns–Nagel, D. et al. Strategies for Bioremediation of 2,4,6–Trintroluene (TNT) Contamianted Soil. Dechema Monogr. abstract.

Roberts, D.J. et al. Optimization of an Aerobic Polishing Stage to Complete the Anaerobic Treatment of Munitions–Contaminated Soils. Environmental Science and Technology. Jun. 1996. abstract.

Norris, R.D. et al. Composting of Explosive Contaminated Soil: Treatability Test and a Comparison with Alternatives. Proceedings of the 1996 Air and Waste Management Conference. 1996. abstract.

(List continued on next page.)

*Primary Examiner*—Steven P. Griffin
*Assistant Examiner*—Maribel Medina
*Attorney, Agent, or Firm*—McDonnell Boehnen Hulbert & Berghoff

[57] ABSTRACT

A process for converting hazard explosives that are contaminating soil into reduced derivatives and thereafter converting the reduced derivatives into humic compounds by admixing the explosives contaminated soil with a natural microorganism source and with an oxidizable carbon source and subjecting the mixture to anaerobic conditions to produce an anaerobic bioremediation product containing reduced concentrations of explosives contaminants and thereafter combining the anaerobic bioremediation product with a compostable material and subjecting the second mixture to aerobic conditions to give an aerobic bioremediation product that is essentially free of explosives contaminants and their reduced derivatives.

14 Claims, 8 Drawing Sheets

OTHER PUBLICATIONS

Warrelmann, J. et al. Microbiological Remediation of Explosives Contaminated Soils: Pilot Project at the Site of Military Old Wastes in Hessisch Lichtenau–Hirschhagen. Terratech. 996. vol. 5 Issue 2. abstract.

Leach, G.J. Evidence for the Chemical Reduction and Binding of TNT During the Composting of Contaminated Soils. Department of the Army Toxicological Study No. 87–3012–95. Jan. 1996. pp. 1–22.

Fernando, T., J.A. Bumpus and S.D. Aust. (1990). "Biodegradation of TNT (2,4,6–Trinitrotuluene) by *Phanerochaete chrysosporium.*" *Appl. Environ. Microbiol.* 56:1666–1671.

Walsh, M.E. (1990). Environmental Transformation Products of Nitroaromatics and Nitramines. U.S. Army Corps of Engineers Cold Regions Research and Engineering Laboratory, Special Report 90–2.

Funk, S.B., D.J. Roberts, D.J. Crawford, and R.L. Crawford, (1993), Initial–Phase Optimization for the Bioremediation of Munition–Contaminated Soils. *Appl. Environ. Microbiol.* 59:2171–2177.

Lenke, H., B. Wagener, G. Daun, and H–J Knackmuss. (1994). TNT–Contaminated soil: A Sequential Anaerobic/Aerobic Process for Bioremediation. P.456. Abstracts of the 94th Annual Meeting of the American Society of Microbiology.

Major, M.A., W.H. Griest, J.C. Amos and W.G. Palmer (1997). Evidence for the Chemical Reduction and Binding of TNT during the Composting of Contaminated Soils. U.S. Army Center for Health Promotion and Preventive Medicine Toxicology Study No. 87–3012–95.

Roy F. Weston, Inc. (1993). Window Composting Demonstration for Explosives–Contaminated Soils at the Umatilla Depot Activity Hermiston, Oregon. Report No. CETHA–TS–CR93043. U.S. Army Environmental Center, Aberdeen, MD.

Manning, J.F., Jr., R. Boothpathy and E.R. Breyfogle. (1996). Field Demonstration of Slurry Reactor Biotreatment of Explosives–Contaminated Soils. Report No. SFI-M–AEC–ET–CR–96178. U.S. Army Environmental Center, Aberdeen, MD.

Goszcyczynski et al., (1991). "Isotopically Labelled Compounds for Hazardous Waste Site Cleanup Investigations: Part I. Synthesis of [penyl–U–$^{14}$C] labelled 2,4–dinitro–6–sec–butylphenol (dinoseb) and [phenyl–U–C–$^{14}$C] labelled 4–n–propylphenol." *Journal of Labelled Compounds and Radiopharmaceuticals*, XXX:35–42.

Stevens et al. (1991). "Selection and Isolation of Bacteria Capable of Degrading Dinoseb (2–sec–butyl–4,6–initrophenol)," *Biodegradation* 2:1–13.

Kaake et al. (1992). Bioremediation of Soils Contaminated with the Herbicide 2–sec–Butyl–4, 6–Dinitrophenol (Dinoseb), *Appl. Env. Microbiol.* 58:1683–1689.

Stevens et al. (1990). "Biodegradation of Dinoseb (2–sec–Butyl–4, 6–Dinitrophenol) in Several Idaho Soils with Various Dinoseb Exposure Histories," *Appl.Env. Microbio.* 56:133–139.

Wallnofer, P.R. et al. (1978). "Transformation of Dinitrophenol–Herbicides by Azotobacter Sp.," *Chemosphere* 12:967–972.

Braun et al., (1984). "Anaerobic Degradation of 2–Aminobenzoate (Anthranilic City) by Denitrifying Bacteria," *Appl. Environ. Microbiol.* 48:102–107.

Berry et al. (1987). "Microbial Metabolism of Homocylic and Heterocyclic Aromatic Compounds Under Anaerobic Conditions," *Microbiol.Rev.* 51:43–59.

Chemical Abstracts 92(16), 1980, Abstract No. 134719 [Abstract of Yang et al., "Bacterial transforming 2,4,6–trinitrololuene and their application, "Wei Sheng Wu Hsueh Pao 19:408–415 (1979).

Doyle et al., (1978) "Effect of Dairy Manure and Sewage Sludge on [14–C]–Pesticide Degradion in Soil," *J. Agric. Food Chem.* 26:987–989.

Federale, (1988). "Mineralization of Monosubstituted Aromatic Compounds in Unsaturated and Saturated Soils," *Can. J. Microbiol.* 34:1037–1042.

Froslie et al, (1970). "Ruminal Metabolish of DNOC and DNBP," *Acta Vet. Scand.* 11:114–132.

Gorontzy et al., (1993). "Microbial transformation of nitroaromatic compounds under anaerobic conditions," *J. Gen. Microbiol.* 139:1331–1336.

Hallas et al., (1983). "Microbial Transformation of Nitroaromatic Compounds in Sewage Effluent," *Appl. Environ. Microbiol.* 45: 1234–41.

Jensen et al., (1967). "Microorganisms that Decompose Nitro–Aromatic Compounds, With Special Reference to Dinitro–Ortho–Cresol," *Acta Agriculture Scandinavica* 17:115–126.

Kaplan et al., (1982). Thermophilic Biotransformations of 2,4,6–Trinitrotoluene Under Simulated Composting Conditions," *Appl. Environ. Microbiol.* 44: 757–760.

Kuhn et al., (1988). "Anaerobic Degradation of Alkylated Benzenes in Denitrifying Laboratory Aquifer Columns," *Appl. Environ. Microbiol.* 54:490–496.

McBride et al., (1986). "Metabolism of the herbicide bromoxynil by *Klebsiella pneumoniae* subsp. ozaenae," *Appl. Environ. Microbiol* 52:325–330.

McCormick, et al, (1976). "Microbial Transformation of 2,5,–6 trinitrotoluene and Other Nitroaromatic Compounds," *Appl. Environ. Microbiol* 31:949–958.

Parris, (1980). "Environmental and Metabolic Transformations of Primary Aromatic Amines and Related Compounds," *Residual Reviews* 76:1–30.

Preuss et al., (1993). "Anaerobic transformation of 2,4,6,–trinitrolouene (TNT)," *Arch. Microbiol.* 159:345–353.

Rafii et al., (1991). "Reduction of nitroaromatic compounds by anaerobic isolated from the human gastrointestinal tract," *Appl. Environ. Microbiol.* 57:962–968.

Smolenski et al., (1987) "Biodegradation of Cresol Insomers in Anoxic Aquifers," *Appl. Environ. Microbiol.* 53: 710–716.

Spain et al., (1979). "Enzymatic Oxidation of p–Nitrophenol," *Biochem. and Biophys. Research Communications* 88:634–641.

Tschech et al., (1988). "Methanogenic Degradation of Anthranilate (2–Aminobenzoate)," *System Appl. Microbiol.* 11:9–12.

Tratnyek et al., (1989). "Abiotic Reduction of Nitro Aromatic Pesticides in Anaerobic Laboratory Systems," *J. Argic. Food Chem.* 37:248–254.

Vlassak et al., (1976). "Dinoseb as a Specific Inhibitor of Nitrogen Fixation in Soil," *Soil Biol. Biochem*, 8:91–93.

Zeyer et al., (1984). "Degradation of o–Nitrophenol and m–Nitrophenal by a *Pseudomnas putida*," *J.Agric. Food Chem.* 32:238–242.

Ziegler et al., (1987). "Studies on the Anaerobic Degradation of Benzoic Acid and 2–Aminobenzoic Acid by a Denitrifying Pseudomans Strain," *Arch. Microbiol.* 149:62–69.

Ziegler et al., (1989). "Activation of Aromatic Acids and Aerobic Acid and 2–Aminobenzoic Acid by a Denitrifying Pseudomans Strain," *Arch. Microbiol.* 151:171–176.

Pumfrey and Roberts, (1993). "A Clostsridium species that grows on 2,4,6–trinitrotoluene (TNT)," (Abstract), *Abstr. Gen. Meet. Am. Soc. Microbiol.*

Schink, (1988). "Principals and Limits of Anaerobic Degradation; Environmental and Technology aspects.

TREATMENT OF TNT-CONTAMINATED SOIL

This application claims priority to U.S. Provisional Patent Application No. 60/057,598 filed on Aug. 29, 1997.

BACKGROUND OF THE INVENTION

(1) Field of the Invention

This invention concerns methods for converting hazardous compounds found in explosives contaminated soils and specifically, nitroaromatic and nitramine explosives into less hazardous compounds by sequential treatment of the contaminated soil under anaerobic and then aerobic conditions.

(2) Description of the Art

The manufacturing of ordnance has resulted in the contamination of soil and groundwater at munitions production installations with explosives compounds. The nitroaromatic compound 2,4,6-trinitrotoluene (TNT) is one of the most important contaminants found at these installations owing to its wide use, toxicity, and persistence in the environment. Over one million cubic yards of TNT contaminated soil are is known to exist at 30 federal facilities, while substantial quantities may require remediation at thousands of smaller military facilities.

To date, the primary technology used for remediation of explosives contaminated soil at these sites has been incineration. Although incineration is highly effective, it suffers from the disadvantages of high cost and public opposition. Therefore alternative cost effective treatment methods are needed. Bioremediation offers the potential to deliver such an alternative.

The complete mineralization of TNT to carbon dioxide by isolated microorganisms in laboratory-scale experiments has been reported. Fernando, T., J. A. Bumpus, and S. D. Aust. 1990. Biodegradation of TNT (2,4,6-Trinitrotoluene) by *Phanerochaete chrysosporium. Appl. Environ. Microbiol.* 56:1666–1671. Although mineralization is not the primary fate of TNT in complex natural environments, substantial biotransformation of TNT has been demonstrated to occur in natural environments. For example, TNT is known to be susceptible to reduction of the nitro groups to amino groups via a multi-step process involving nitroso and hydroxylamine intermediates. Walsh, M. E. 1990. Environmental Transformation Products of Nitroaromatics and Nitramines. U.S. Army Corps of Engineers Cold Regions Research and Engineering Laboratory, Special Report 90-2. It is also known that the predominant metabolite produced under aerobic conditions is 4-amino-2,6-dinitrotoluene (4A26DNT), while under mildly acidic (pH 6) and anaerobic conditions the 2,4-diamino-6-nitrotoluene (24DA6NT) reduction product is most prevalent. Funk, S. B., D. J. Roberts, D. J. Crawford, and R. L. Crawford. 1993. Initial-Phase Optimization for the Bioremediation of Munition-Contaminated Soils. *Appl. Envrion. Microbiol.* 59:2171–2177. The complete conversion of TNT to 2,4,6-triaminotoluene (TAT) has been reported in samples maintained under strictly anaerobic conditions and low redox potentials (Eh<−200 mV) in the presence of a readily oxidizable carbon source. Lenke, H., B. Wagener, G. Daun, and H.-J. Knackmuss. 1994. TNT-contaminated soil: A Sequential Anaerobic/Aerobic Process for Bioremediation. P.456. Abstracts of the 94$^{th}$ Annual Meeting of the American Society of Microbiology.

The reduction of TNT to 24DA6NT, 26DA4NT, and TAT is important because aromatic amines can be incorporated into the organic fraction present in soil or compost by forming covalent bonds with a variety of functional groups during the natural process of humification. Major, M. A., W. H. Griest, J. C. Amos and W. G. Palmer. 1996. Evidence for the Chemical Reduction and Binding of TNT during the Composting of Contaminated Soils. U.S. Army Center for Health Promotion and Preventive Medicine Technical Report No. A324278. This binding of aromatic amines into the organic matrix of soils is believed to be irreversible and facilitated by aerobic processes. Aerobic post-treatment may also accelerate the degradation of intermediates produced during anaerobic conditions and speed the consumption of excess carbon which, due to its high oxygen demand, has been reported to cause toxicity to *Daphnia magna*.

Bioremediation processes that seek to exploit certain aspects of these findings have been developed. The U.S. Army Environmental Center (USAEC), (formerly the U.S. Army Toxic and Hazardous Materials Agency), has developed composting techniques for explosives contaminated soil. This work has led to the field-scale use of composting at the U.S. Army's Umatilla Depot in Hermiston, Oreg. Roy F. Weston, Inc. 1993. Windrow Composting Demonstration for Explosives-Contaminated Soils at the Umatilla Depot Activitiy Hermiston, Oreg. Report No. CETHA-TS-CR-93043. U.S. Army Environmental Center, Aberdeen, Md. Although composting is currently the only technology to have been employed for full-scale cleanup, the USAEC has also sponsored the demonstration of a bioslurry process that cycles between aerobic and anaerobic phases and uses molasses as an oxidizable carbon substrate. Manning, J. F., Jr., R. Boothpathy and E. R. Breyfogle. 1996. Field Demonstration of Slurry Reactor Biotreatment of Explosives-Contaminated Soils. Report No. SFIM-AEC-ET-CR-96178. U.S. Army Environmental Center, Aberdeen, Md.

Despite the advances made in remediating nitroaromatic and nitramine munitions contaminated soils there still remains a need for a soil remediation process that is simple and safe. There is also a need for a process that efficiently converts hazardous nitroaromatic and nitramine contaminants into less hazardous and/or non-hazardous substituents.

SUMMARY OF THE INVENTION

It is an object of this invention to provide methods for converting hazardous nitrogen containing explosives compounds present in soil into nonhazardous byproducts.

It is a further object of this invention to provide an inexpensive natural process that converts hazardous nitrogen containing explosives compounds found in soils into nonhazardous components.

It is yet another object of this invention to provide a practice that quickly converts hazardous nitrogen containing explosives compounds found in soils into nonhazardous compounds.

In one embodiment, this invention is a process for remediating soil contaminated with explosives. The process uses a bioremediation mixture comprising soil contaminated with explosives, at least one natural microorganism source, and at least one oxidizable carbon source. The bioremediation mixture is first maintained under anaerobic conditions for a period of time sufficient to convert at least a portion of the explosives contaminants into reduced derivatives to give an anaerobic bioremediation product. The anaerobic bioremediation product is then used to prepare an aerobic bioremediation mixture by combining it with at least one compostable material. The aerobic bioremediation mixture is then maintained under aerobic conditions for a period of time sufficient to give an aerobic bioremediation product that is essentially free of explosives contaminants or their derivatives.

DESCRIPTION OF THE CURRENT EMBODIMENT

Figure 1:
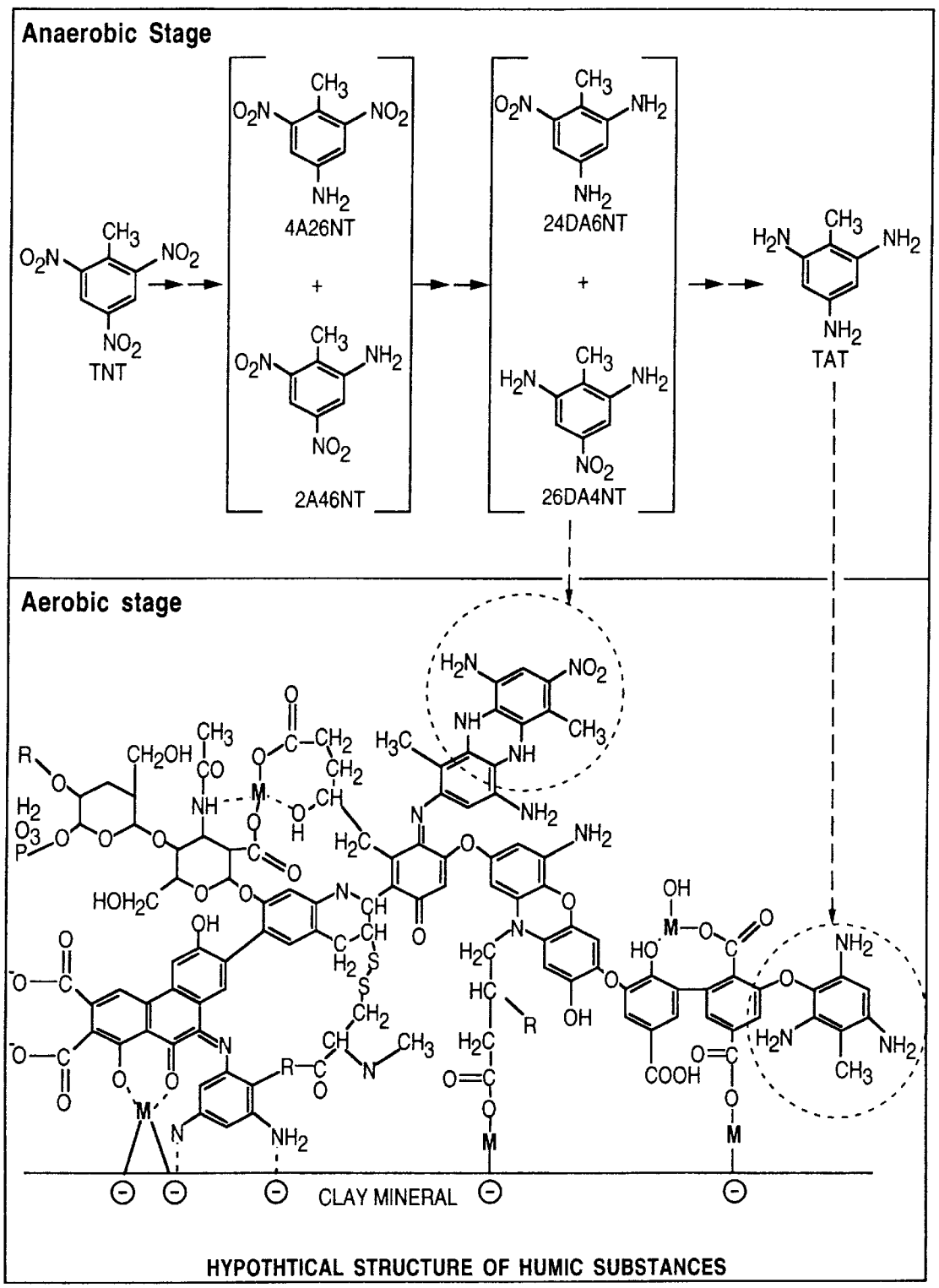
FIG. 1 is a representation of the chemical reactions that occur during the anaerobic stage of the process of this invention to convert explosives contaminates into reduced derivatives and of the reactions that occur during the aerobic stage to incorporate the reduced derivatives into humic compounds.

The process of this invention is a two-step biologically mediated reduction and humification process in which the nitro functional groups on explosive soil contaminants are first reduced under anaerobic conditions by naturally occurring microorganisms. In the second step, the reduced residues are bound to soil organic matter such as naturally occurring humic substances under aerobic conditions by composting in the presence of organic material such as green or yard waste.

In the first phase of the process of this invention, soil containing explosive contaminants is subjected to anaerobic conditions for a period of time sufficient to convert at least some of the contaminants into reduced derivatives. The anaerobic step is accomplished by first preparing an anaerobic bioremediation mixture containing explosives contaminated soil, a source microorganism, and a readily oxidizable carbon source. The explosives contaminated soil useful in the process of this invention may be any type of soil that includes hazardous explosives contaminants such as, but not limited to, 2,4,6-trinitrotoluene (TNT), 2,4- and 2,6-dinitrotoluene (DNT), 1,3,5-trinitrobenzene (TNB), octahydro-1,3,5,7-tetranitro-1,3,5,7-tetrazocine (HMX), hexahydro- 1,3,5-trinitro- 1,3,5- triazine (RDX), and methyl-2,4,6-trinitrophenylnitramine (Tetryl). In an alternative embodiment, the process of this invention may be used to convert hazardous explosives contaminants into nonhazardous reduced derivatives by mixing explosives contaminants with contaminated or uncontaminated soils to give an explosives contaminated soil and thereafter remediating the soil mixture according to the process of this invention.

The process of this invention is useful for remediating explosives contaminated soil containing as much as 30,000 parts per million by weight of explosives contaminants. It is preferred that the explosives contaminated soil used to create the anaerobic bioremediation mixture contains less than about 10,000 parts per million by weight of explosives contaminants. If necessary, uncontaminated soil may be admixed with explosives contaminated soil to reduce the concentration of explosives contaminants in the soil used to a desired concentration before using the explosives contaminated soil to prepare an anaerobic bioremediation mixture.

The explosives contaminated soil is combined with a microorganism source to give an anaerobic bioremediation mixture. The term "microorganism" refers to any naturally existing microorganisms including, for example, bacteria, protozoa, fungi, and mixtures thereof. Sources of useful naturally occurring microorganisms include, but are not limited to, animal manures such as cow and horse manure, anaerobic digester sludge, aerobic digester sludge, sewage sludge and mixtures thereof. It is preferred that the microorganism source is animal manure, sewage sludge or a combination thereof. It is also preferred that the anaerobic bioremediation mixture includes from about 10% to about 50% by weight of a naturally occurring microorganism source, and most preferably, from about 15% to about 35% by weight of a naturally occurring microorganism source.

Another ingredient of the anaerobic bioremediation mixture is an oxidizable carbon source. The oxidizable carbon source may be any material that includes purified or naturally occurring carbohydrates such as glucose, sucrose, fructose or other sugars, or starches derived from or contained in agricultural products. Examples of useful oxidizable carbon sources include dextrose, molasses, beet juice, potatoes, sweet potatoes, corn starch, potato starch, and mixtures thereof. It is preferred that the carbon source is a water-soluble carbohydrate such as dextrose. The oxidizable carbon source should be incorporated into the anaerobic bioremediation mixture in an amount ranging from about 0.5 to about 5% by weight. It is preferred that the oxidizable carbon source is present in the anaerobic bioremediation mixture in an amount ranging from about 1% to about 2% by weight. The ingredients used in the anaerobic bioremediation mixture may be combined by any method known in the art for combining large amounts of solid materials. The materials may be combined using a backhoe, bulldozer, batch mixer, pugmill, or windrow composter. It is preferred that the anaerobic bioremediation mixture ingredients are combined with one another using a windrow composter or turner.

The combined anaerobic bioremediation mixture is allowed to reach anaerobic conditions. Anaerobic conditions are achieved by isolating the anaerobic bioremediation mixture from sources of oxygen such as air. The anaerobic bioremediation mixture can be isolated from oxygen sources by adjusting the moisture content to near saturation with water, by placing the anaerobic bioremediation mixture in an air impermeable vessel or containment structure, by covering the mixture with plastic tarp, concrete, or other air impermeable cover, or by placing the anaerobic bioremediation mixture into a landfill and thereafter covering the anaerobic bioremediation mixture with a soil cap, or other gas impermeable material. It is preferred that the anaerobic bioremediation mixture is brought to anaerobic conditions by locating the mixture in a pit, trough, or other bermed recession and thereafter covering the anaerobic bioremediation mixture with a gas impermeable tarp, soil cap, or other cover.

During anaerobic bioremediation, it is important that the moisture level of the anaerobic bioremediation mixture is maintained within a range from about 50% to about 100% or more of the water holding capacity (saturation moisture content) of the mixture. The preferred anaerobic bioremediation mixture moisture level is at or very near 100% of the water holding capacity (saturation moisture content). A most preferred anaerobic bioremediation moisture content is about 80% to about 95% the water holding capacity of the anaerobic bioremediation mixture. Maintaining the moisture level of the anaerobic bioremediation mixture within the desired range promotes efficient anaerobic reduction of the nitro functional groups of the explosive contaminant molecules so that they can be bound to humic material during the aerobic humification step. The moisture level of the anaerobic bioremediation mixture may be adjusted by adding water during the mixture preparation. In addition, or alternatively, moisture can be injected into the anaerobic bioremediation mixture during the anaerobic bioremediation step in order to maintain the mixture moisture level within the desired range. In addition, the anaerobic bioremediation temperature may be monitored during the bioremediation step and moisture can be added to the mixture to maintain the anaerobic bioremediation temperature within the desirable range of 21° C. to 45° C.

It is also within the scope of this invention to inject a source of oxidizable carbon and/or a natural source of microorganisms into the anaerobic bioremediation mixture during the anaerobic bioremediation step. Injecting carbohydrate and/or naturally occurring microorganisms into the anaerobic bioremediation mixture in solution or as an aqueous slurry, in some cases, enhances the anaerobic bioremediation rate.

The anaerobic bioremediation mixture is allowed to remain under anaerobic conditions for a period of time sufficient to convert at least some of the explosives contaminants into their reduced derivatives. It is preferred that the anaerobic bioremediation mixture is maintained at anaerobic conditions for a period of time sufficient to covert at least as much of the explosives contaminant mass into reduced derivatives to result in contaminant concentrations less than those required for remediation of the soil. A period of time ranging from about 14 days to about 200 days or more will be generally necessary to achieve the desired level of contaminant conversion.

Once the desired amount of explosives contaminants have been converted into reduced derivatives in the anaerobic bioremediation step, the anaerobic bioremediation product is combined with an compostable material to give an aerobic bioremediation mixture. Thereafter, the aerobic bioremediation mixture is subjected to aerobic bioremediation conditions for a period of time sufficient to further reduce the amount of reduced contaminant derivatives in the mixture. During the anaerobic bioremediation step, the nitro groups on the nitrogen containing explosives contaminants are converted into reduced derivatives including amine groups. During the aerobic bioreduction step, the amine derivatives are incorporated into humic compounds. The humic compounds are produced by soil microorganisms acting on the organic matter such as the compostable material. The soil microorganisms convert the compostable organic matter and the amine containing derivatives compound into humic compounds. As a result, the amine derivative compounds are not identifiable by laboratory analysis as distinct chemical entities.

The compostable material that is combined with the anaerobic bioremediation product to give an aerobic bioremediation mixture may be any material that is typically used for composting. Examples of compostable materials include yard wastes such as grass clippings, wood chips, and leaves, paper materials, compostable municipal solid waste and mixtures thereof. The compostable material may also be a material that is collected at landfill sites for aerobic bioreduction. A preferred compostable material is a mixture of yard waste materials.

The aerobic bioremediation mixture comprises an anaerobic bioremediation product combined with one or more compostable material in a volume ratio ranging from about 0.33:1 to about 1.5:1 to give an aerobic bioremediation mixture. Moisture and nutrients may be added to the aerobic bioremediation mixture in order to facilitate the aerobic composting of the mixture. The aerobic bioremediation mixture is then subjected to aerobic conditions wherein an oxygen containing gas such as air and/or oxygen is supplied to the mixture to facilitate aerobic decomposition of the compostable material and accompanying incorporation, by humification, of the reduced contaminant residues. In order to achieve aerobic conditions, the aerobic bioremediation mixture may be aerated either by mechanical agitation with exposure to air, as with a windrow composter, or by having air introduced under pressure through pipes installed in the mixture. During aerobic treatment the aerobic bioremediation mixture may be contained in a vessel or stacked in a pile or windrow. It is preferred that the aerobic bioremediation occurs in a windrow, with mechanical mixing and aeration by a windrow composter.

During the aerobic bioreduction step, the aerobic bioreduction mixture should be maintained at a temperature from about 30° C. to about 150° C. The temperature can be controlled by adding moisture to the mixture and by adjusting the frequency or rate of aeration of the aerobic bioremediation mixture. If necessary, nutrients may be added to the aerobic bioremediation mixture under aerobic conditions in order to facilitate the aerobic humification of the remaining reduced explosives derivatives. Typically moisture will be added to the aerobic bioremediation mixture when it visually appears to be dry.

The aerobic bioremediation step occurs for a period of time sufficient to decrease the concentrations of explosives contaminants and their reduced derivatives to concentrations below the accepted standards for the proposed use of the treated product. Generally the aerobic bioremediation mixture will be maintained at aerobic conditions for a period of time ranging from about 10 days to about 60 days or more.

The process of this invention effectively reduces the weight amounts of explosives contaminants in contaminated soils below the level required for soil to be used for both site specific restricted uses and to be used for unrestricted uses. In order for the remediated soil to be used for site specific restricted uses, ("restricted soil"), the weight of explosives contaminants in the remediated soil should not exceed the following amounts: TNT-480 ppm; RDX-40 ppm; HMX-33,000 ppm; Tetryl-6500 ppm; 2,4DNT-1300 ppm; and 2,6DNT-650 ppm. In order for the remediated soil produced by the process of this invention to be used for unrestricted uses, ("unrestricted soil"), the explosives contaminants found in the remediated soil should not exceed the following values: TNT-48 ppm; RDX-40 ppm; HMX-3,300 ppm; tetryl-650 ppm; 24DNT-130 ppm; 2,6DNT-65 ppm; and DNT mixture-0.65 ppm. The length of time that the processes of this invention must be operated in order to produce a restricted soil or unrestricted soil will vary depending primarily upon the amount of explosives contaminants found in the explosives contaminated soil. Typically the process of this invention will reduce the amount of explosives contaminants in an explosives contaminated soil by at least 90% when the soil includes at least 1000 mg per kg of explosives contaminants. The weight percent explosives contaminant reduction will increase with increasing weight amount of explosives contaminants in the contaminated soil. Once the aerobic bioremediation step is complete, the soil may be used as deemed appropriate by regulatory authorities, as a landfill cap or for other landfill purposes.

EXAMPLE 1

This example shows the application of the two step process of this invention to TNT contaminated soil. In the present study, TNT contaminated soil was combined with anaerobic digester sludge, cow manure, one of three different oxidizable carbon sources, and water. After anaerobic incubation, a select number of samples were combined with three different aerobic compostable materials. The rationale for the subsequent aerobic treatment is to facilitate aerobic degradation of any residual nitroaromatic substrates and intermediates remaining after anaerobic treatment, and to promote binding of amine intermediates to the humus-rich yard waste compost matrix.

TNT-contaminated soil and uncontaminated background soil samples were collected at the Pueblo Army Depot, Pueblo, Colo., in clean five-gallon plastic containers. TNT was quantified at a concentration of 23,000 mg/kg in the contaminated samples.

TNT and amino metabolites were analyzed according to USEPA SW-846 Method 8330. Liquid chromatography analysis was performed with a Hewlett-Packard model HP 1090M HPCL equipped with a PV-5 solvent delivery system, auto-injector system, a 5 μm $C_{18}$ reverse-phase column, and diode array detector. A minimum of 12 g of sample was extracted in acetonitrile using sonication. HPLC sample results were confirmed by GC/MS. Standards for 2,4-diamino-6-nitrotoluene, and 2-6-diamino-4-nitrotoluene were obtained from AccuStandard Inc., West Haven, Conn.

I. Anaerobic Biological Treatment

The experimental design for the anaerobic phase is presented in Table 1. For the purpose of the evaluation, an initial TNT concentration of 3,000 mg/kg was targeted. To achieve the desired starting concentration, 0.70 kg of the TNT-contaminated soil was mixed with 3.50 kg of the uncontaminated background soil and 1.2 kg of 50 mM phosphate ($PO_4$) buffer or 1.2 kg of 50 mM $PO_4$-buffered inoculum.

The study was performed using 8.0 L closed glass reactors for each of the six treatments. Final volume of the soil mixture in each reactor was approximately 4.0 liters. Reactor 6 was a control for the entire study and was designed to quantify the degradation of TNT in unamended $PO_4$-buffered soil. The benefit of the addition of starch at a concentration of 0.25% (w/v) in $PO_4$-buffered soil was evaluated in Reactor 1. The added benefit of inoculating that mixture with anaerobic digester sludge and cow manure was evaluated in Reactor 2. The 1.2 L inoculum was prepared by mixing 2 gallons supernatant from the settled sludge of an anaerobic digester with 2 gallons fresh cow manure. The inoculum was $PO_4$-buffered (50 mM) at pH of ~7.0 by addition of 73.69 g dibasic potassium phosphate ($K_2HPO_4$) and 45.45 g of monobasic potassium phosphate ($KH_2PO_4$).

Degradation of TNT at a higher starch concentration (1.0% w/v) in combination with glucose (1.0% w/v) in inoculated $PO_4$-buffered soil was examined in Reactor 3. The added benefit of including a vitamin rich yeast extract and additional glucose in the mixture of Reaction 3 was evaluated in Reactor 4. Reactor 5 was prepared similar to that of Reactor 3 but with the substitution of molasses for starch and glucose.

The reactors were initially monitored on a daily basis for pH and redox potential. The pH was determined using a VWR Scientific (San Francisco, Calif.) pH probe (Catalog No. 34100-975) in combination with a Beckman Instruments (Fullerton, Calif.) Model 011 pH meter. Redox potential was determined using a Corning (Corning, N.Y.) redox combination probe (Catalog No. 476080) in combination with the Beckman Instruments (Fullerton, Calif.) Model 011 pH meter. As pH and redox potential stabilized in the reactors, the frequency of monitoring the reactors was gradually reduced from daily monitoring to weekly monitoring.

Samples were collected from the reactors on Days 0, 7, 14, 20, 29, 41 and 57 and analyzed for TNT and its transient transformation products.

II. Aerobic Biological Treatment

On Day 29, the soil was removed from Reactors 4, 5, and 6 and subdivided (by volume) into three equal portions in preparation for aerobic biological treatment of any remaining TNT and/or its transient reduced derivatives. The aerobic composting techniques used for the evaluation, using three compost mixtures, are summarized in Table 2. The Colorado and Louisville Composts were prepared in a 1:1 ratio (by volume) of finished yard waste compost: active

TABLE 1

Anaerobic Treatment Experimental Design

| Parameter | Reactor Number | | | | | |
| --- | --- | --- | --- | --- | --- | --- |
| | 1 | 2 | 3 | 4 | 5 | 6 |
| Soil, kg (L) | 4.2 (2.8) | 4.2 (2.8) | 4.2 (2.8) | 4.2 (2.8) | 4.2 (2.8) | 4.2 (2.8) |
| 50 mM $PO_4$ buffer, kg | 1.2 | — | — | — | — | 1.2 |
| 50 mM $PO_4$— buffered inoculum, kg | — | 1.2 | 1.2 | 1.2 | 1.2 | — |
| Starch, g (% w/v) | 10 (0.25) | 20 (0.50) | 40 (1.0) | 40 (1.0) | — | — |
| Glucose, g (% w/v) | — | — | 40 (1.0) | 80 (2.0) | — | — |
| Molasses, g (% w/v) | — | — | — | — | 80 (2.0) | — |
| Vitamins, mg (mg/kg) | — | — | — | 54 (10) | — | — | yard waste compost from Waste Management, Inc. Landfills located in Fountain, Colo. and Louisville, Ky. The green waste compost was prepared in a 1:1:½:½ ratio (by volume) of horse manure:straw:bailed alfalfa:fresh alfalfa. The well-mixed soil-compost mixtures were appropriately moistened and placed into treatment trays. Each of the trays was covered with a clear plastic wrap for the purposes of maintaining an optimum moisture level with each compost mixture. On a weekly basis, each compost mixture was mixed and, if required, the moisture level was readjusted.

and glucose, or molasses, attained redox values of approximately −200 mV after six days and in general maintained those values over the course of incubation. Reactor 5, supplemented with 80 g of molasses attained the most rapid reduction in redox potential, followed in order by: Reactor 3 (40 g starch and 40 g glucose)>Reactor 2 (2 g starch) >Reactor 4 (40 g starch and 80 g glucose). Reactor 3, which was maintained under anaerobic conditions for a total of 57 days, ultimately achieved the lowest measured redox potential of less than −400 mV.

TABLE 3

TNT and Amino Metabolite Results (mg/kg) Before and After 29 Days of Anaerobic Treatment

| Parameter | Reactor 1 | | Reactor 2 | | Reactor 3 | | Reactor 4 | | Reactor 5 | | Reactor 6 | |
|---|---|---|---|---|---|---|---|---|---|---|---|---|
| | Day 0 | Day 29 | Day 0 | Day 29 | Day 0 | Day 29 | Day 0 | Day 29 | Day 0 | Day 29 | Day 0 | Day 29 |
| TNT | 4500 | 4204 | 4200 | 358 | 3000 | 20 | 3400 | 101 | 3350 | 52 | 4400 | 4484 |
| ADNT | <13 | <13 | <13 | 1257 | <13 | <6 | <13 | 48 | <13 | <6 | <13 | <13 |
| 24DA6NT | <13 | <13 | <13 | 226 | <13 | 120 | <13 | 322 | <13 | 224 | <13 | <13 |
| 26DA4NT | <13 | <6 | <13 | 82 | <13 | 20 | <13 | 104 | <13 | 83 | <13 | <6 |

Composite samples were collected for analysis of TNT and its transformation products on Days 0, 17, and 28.

TABLE 2

Aerobic Treatment Experimental Design

| Compost | Reactor Number | | |
|---|---|---|---|
| | 4 | 5 | 6 |
| Colorado Compost, L | Reactor 4A 0.9 soil 1.3 compost | Reactor 5A 1.0 soil 1.4 compost | Reactor 6A 0.9 soil 1.3 compost |
| Louisville Compost, L | Reactor 4B 0.9 soil 1.3 compost | Reactor 5B 0.9 soil 1.3 compost | Reactor 6B 0.9 soil 1.3 compost |
| Green Waste Compost, L | Reactor 4C 0.9 soil 1.3 compost | Reactor 5C 0.9 soil 1.3 compost | Reactor 6C 0.9 soil 1.3 compost |

III. Results

A. Anaerobic Phase Results

Figure 2:
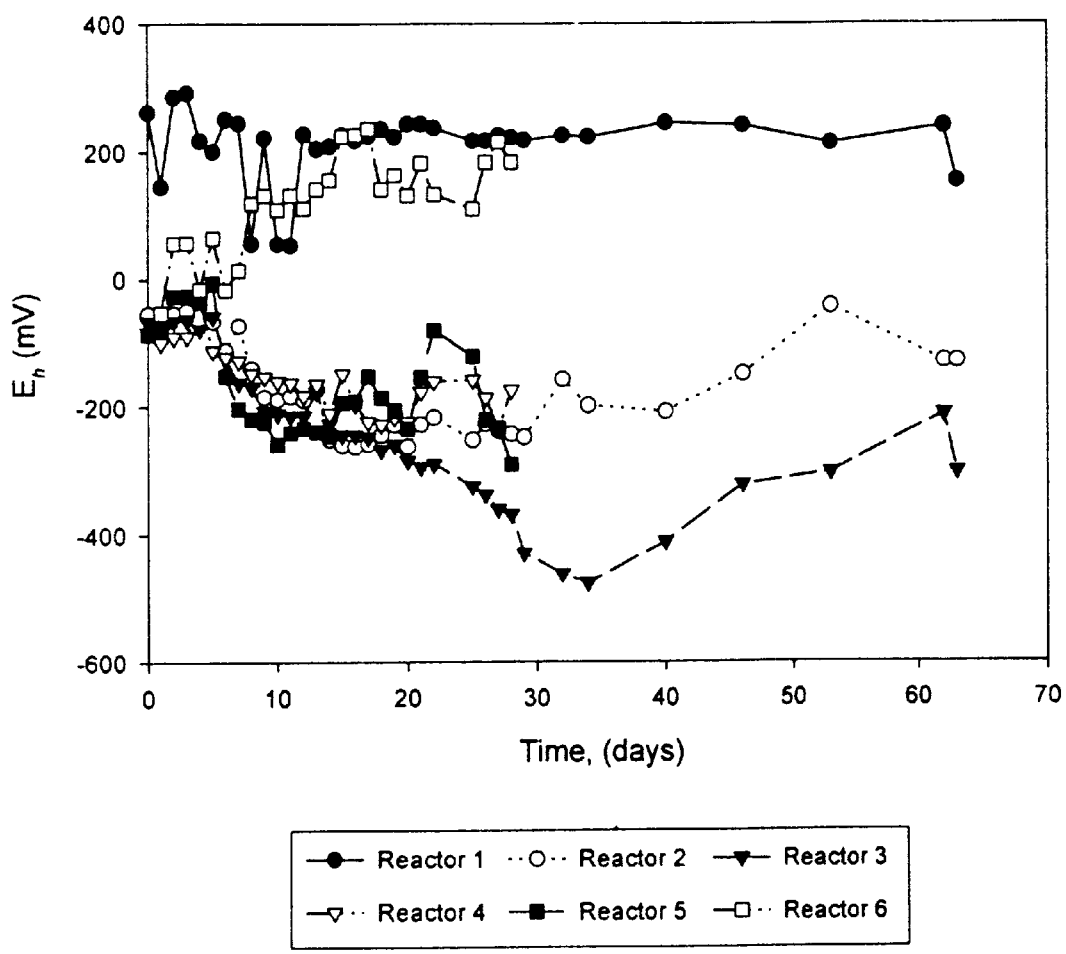
FIG. 2 is a plot of the redox potential measured during anaerobic incubation for the reactors identified in Table 1 of Example 1.
Figure 3:
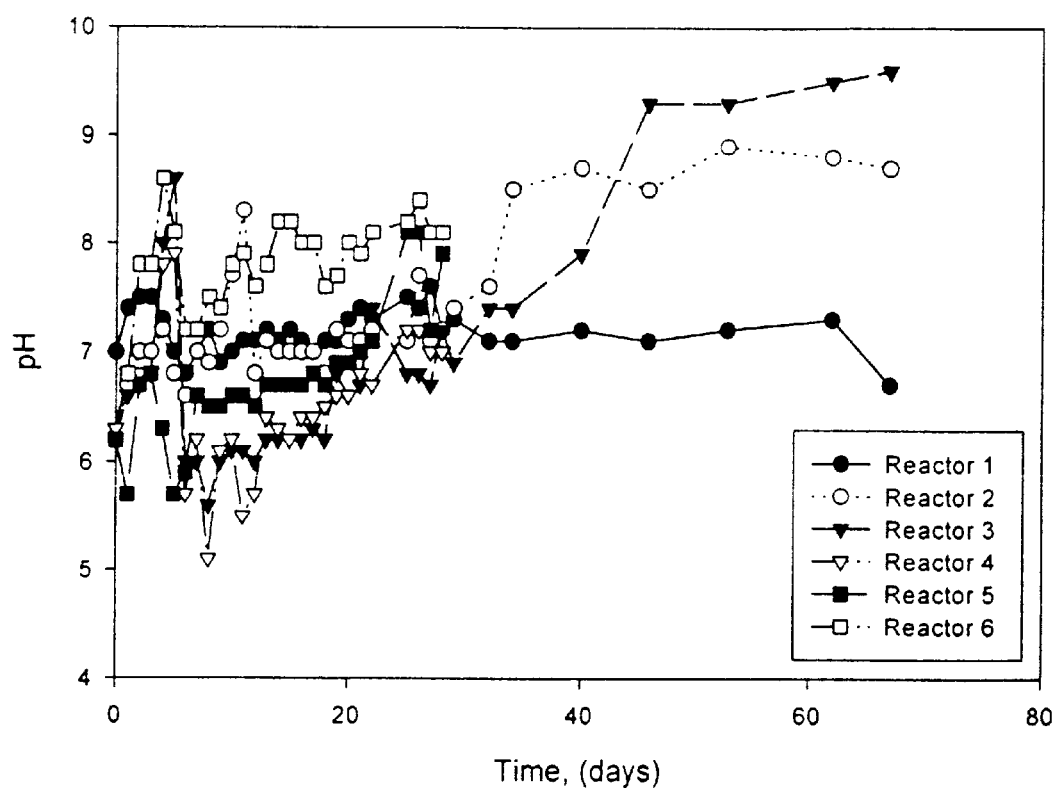
FIG. 3 is the pH measured during anaerobic incubation for the reactors identified in Table 1 of Example 1.

During the anaerobic phase of treatment no removal of TNT or production or reduced intermediates was observed in control Reactor 6, the uninoculated and unamended control sample. The redox potential for this sample was initially measured at −50 mV but rapidly increased to approximately 100 mV and held at that level for the remainder of the test. In Reactor 1, the other control sample, supplemented with 10 g starch and Inoculum, a slight reduction in TNT and low concentrations of reduced intermediates were observed after 41 days of incubation. The measured redox potential for this sample remained around 200 mV throughout the 57 days of monitoring. Redox potential and pH monitoring results for each of the six reactors over the course of anaerobic incubation are presented in FIGS. 2 and 3 respectively.

Remaining Reactors 2–5, inoculated and supplemented with an external oxidizable carbon source of starch, starch The concentrations of TNT and amino reduction products at the start and after 29 days of anaerobic incubation are summarized in Table 3. Contrary to the expectation that the greatest extent of treatment would be realized in Reactor 4 and Reactor 5 (the reactors containing the highest level of carbohydrate addition), Reactor 3 showed the greatest extent of removal for TNT and the lowest accumulation of amino metabolites. Results in descending order of TNT conversion efficiency were: Reactor 3 at 99.3%, Reactor 5 at 98.4%, Reactor 4 at 97.0% and Reactor 2 at 91.4%. These results were generally consistent with the redox monitoring results which show that Reactor 3 maintained the lowest redox potential during the anaerobic incubation. Reactor 3, which was held under anaerobic conditions for a total of 57 days, ultimately achieved >99.6% removal of TNT and contained a combined amino metabolic concentration of 35 mg/kg.

Figure 4:
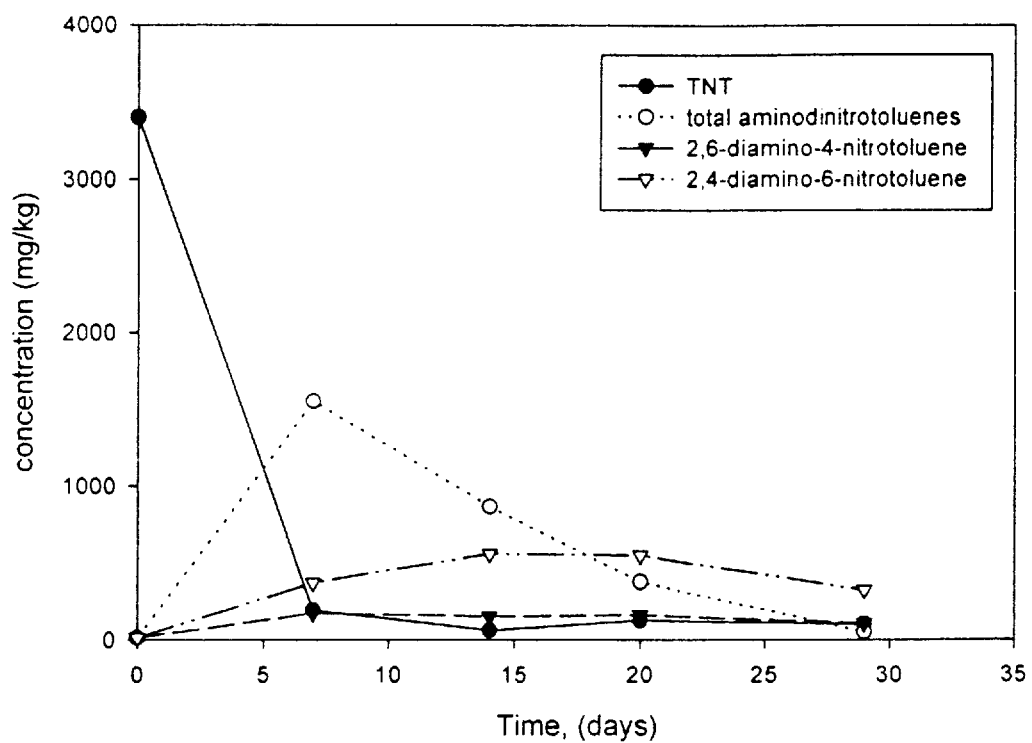
FIG. 4 is a plot of the concentration of various TNT contaminants in Reactor 4 of Example 1 during the anaerobic reaction phase.
Figure 5:
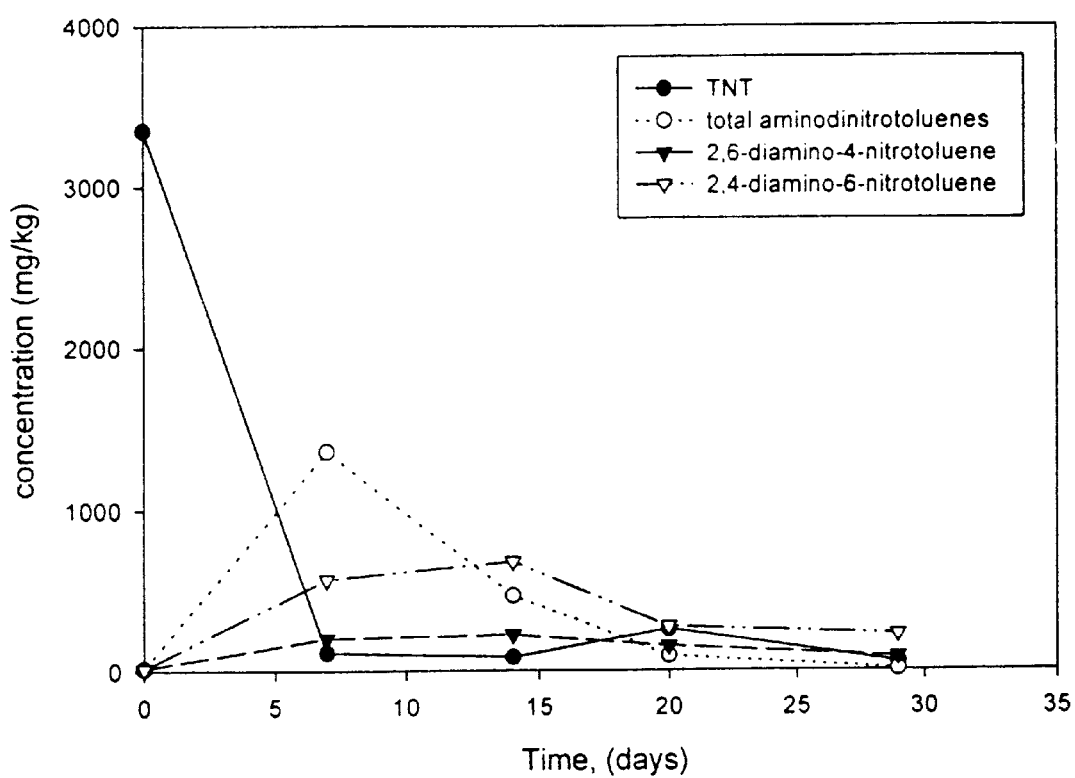
FIG. 5 is a plot of the concentration of various TNT contaminants versus time for Reactor 5 of Example 1 during the anaerobic phase.

Results of time course sampling of Reactor 4 and Reactor 5 for TNT and amino metabolites are presented in FIGS. 4 and 5 respectively. Both reactors show similar trends for the removal of TNT and the stepwise production of reduced amino substituted products. The majority of TNT removal occurred within the first 7 days if incubation. The graphs illustrate the sequential reduction of TNT through ADNT and diaminonitrotoluene intermediates. Additionally, the formation of the 24DA6NT isomer in preference to the 26DA4NT isomer was observed. Diaminonitrotoluene concentrations peaked by 14 days of incubation with a subsequent slow decline.

B. Aerobic Composting Results

Aerobic composting resulted in additional removal of residual TNT. Overall reduction in TNT for soil from Reactor 4 and Reactor 5 combined with the three compost mixtures ranged from 98.6% to 99.8%. Substantial removal of TNT from Reactor 6, the anaerobic control, ranged from 79.1% to 92.3% over the three compost mixtures. The concentration of TNT and reaction products measured during the aerobic composting phase are summarized in Table 4.

TABLE 4

TNT and Amino Reduction Product Results During Aerobic Composting
Contaminant Concentration (mg/kg) After Mixing with Compost

| | 0 days | | | | 17 days | | | | 28 days | | | |
|---|---|---|---|---|---|---|---|---|---|---|---|---|
| Reactor | TNT | ADNT | 24DA6NT | 26DA4NT | TNT | ADNT | 24DA6NT | 26DA4NT | TNT | ADNT | 24DA6NT | 26DA4NT |
| 4A | 40 | 82 | 185 | 74 | 110 | 59 | 71 | 27 | 41 | 33 | 36 | 19 |
| 4B | 28 | 48 | 384 | 70 | 21 | 29 | 150 | 49 | 48 | 10 | 58 | 17 |
| 4C | 113 | 70 | 230 | 56 | 15 | 15 | 130 | 26 | 6 | 16 | 90 | 41 |
| 5A | 45 | 6 | 83 | 45 | 31 | 8 | 14 | 10 | 37 | 4 | 12 | 7 |
| 5B | 187 | 50 | 130 | 48 | 9 | <0.3 | 33 | 18 | 27 | 4 | 15 | 10 |
| 5C | 58 | 19 | 114 | 50 | 56 | 10 | 69 | 31 | 13 | 5 | 24 | 16 |
| 6A | 2080 | <6 | <13 | <13 | 2000 | 33 | <13 | <13 | 920 | 35 | <13 | <13 |
| 6B | 1950 | <6 | <13 | <13 | 710 | 23 | <13 | <13 | 740 | 62 | <13 | <13 |
| 6C | 1300 | 330 | <13 | <13 | 960 | 290 | <13 | 16 | 340 | 320 | <13 | <13 |

Of the three compost mixtures evaluated, the green waste mixture containing horse manure, straw, and alfalfa yielded the greatest extent of TNT removal across the test soils. In the sample containing unamended, uninoculated soil mixed with the green waste mixture, ADNT was detected within 2 hours after mixing. After 17 days, the presence of 26DA4NT was also detected in this sample. Samples containing the unamended, uninoculated soil combined with the two yard waste composts also produced ADNT, but at an order of magnitude lower concentration and after a longer incubation (17 days) than the sampling containing the green waste mix.

Samples containing soil from Reactor 4 and Reactor 5 combined with the yard waste composts from Louisville and Colorado showed greater removal of ADNT and DANT than samples with soil combined with the green waste mixture. This result may be explained by the fact that the yard waste composts contain a high concentration of humus and can reasonably expected to contain organisms that participate in the humification process.

This example shows that the coupling of anaerobic and aerobic treatment for the TNT-contaminated soil was highly effective, removing up to 99.8% of the starting TNT concentration. Monitoring the TNT and reaction intermediates over the course the anaerobic treatment indicates TNT was sequentially reduced to monoamino- and then diamino-intermediates, with 24DA6NT being the predominant diamino isomer. These results, coupled with the low redox potential maintained in the reactors, suggest that a large percentage of TNT was converted to TAT.

Aerobic composting results indicate that each of the compost mixtures evaluated provided further reduction in the concentration of TNT and amino metabolites. The green waste mixture provided better TNT removal while the yard waste composts demonstrated better removal of the amino intermediates. This may be attributable to the higher humus content of the yard waste composts providing a better medium for binding of the TNT reduction products. While the mechanism of the removal of the amino intermediates observed in the aerobic composting phase cannot be assessed from the methods used in this study, a combination of binding and biotransformation is a reasonable explanation.

Results of this study clearly indicate the sequential anaerobic-aerobic process evaluated achieves rapid and substantially complete removal of TNT and associated amino metabolites.

EXAMPLE 2

This example illustrates the use of different combinations of microorganism and oxidizable carbon sources to promote the degradation of TNT, RDX, and HMX during the anaerobic reduction step of the process.

In this study explosives contaminated soil from the Joliet Army Ammunition Plant located in Joliet, Ill. was used. The soil was contaminated with TNT (1,500 mg/kg), RDX (1,000 mg/kg), and HMX (200 mg/kg). A total of seven tests were performed using combinations of four different microorganism sources and three different carbon sources as reported in Table 5. Tests were conducted in laboratory scale reactors. Each reactor contained 22.5 kg of the combined anaerobic bioremediation mixture. The moisture content of each reactor was adjusted to approximately 100% water holding capacity. Reactors were sealed, placed in a greenhouse, and allowed to incubate anaerobically. Soil samples were collected from each reactor approximately every two to three weeks and analyzed for explosives by USEPA SW-846 Method 8330.

Table 5 reports soil analysis results for TNT, RDX, and HMX for each reactor after 137 days of anaerobic treatment. The analysis results indicate that the anaerobic bioremediation step significantly reduces the amount of explosives contaminants in a contaminated soil.

TABLE 5

| | | Explosive Contaminant Reduction (%) | | |
|---|---|---|---|---|
| Test No. | Anaerobic Bioremediation Mixture Composition (% wt basis) | TNT | RDX | HMX |
| 1 | 75:23:1:1 | 99.8 | 99.9 | 98.8 |
| | Soil:cow manure:potato waste:dextrose | | | |
| 2 | 75:11.5:11.5:1:1 | 99.8 | 99.9 | 98.6 |
| | soil:cow manure:anaerobic sludge:potato waste:dextrose | | | |

TABLE 5-continued

| Test No. | Anaerobic Bioremediation Mixture Composition (% wt basis) | Explosive Contaminant Reduction (%) | | |
|---|---|---|---|---|
| | | TNT | RDX | HMX |
| 3 | 75:11.5:11.5:2<br>Soil:cow manure:anaerobic sludge:dextrose | 99.9 | 99.9 | 98.6 |
| 4 | 75:23:1:1<br>Soil:horse manure:potato waste:dextrose | 98.8 | 56.3 | 37.1 |
| 5 | 75:23:1:1<br>Soil:aerobic sludge:potato waste:dextrose | 99.0 | 97.0 | 54.7 |
| 6 | 75:23:1:1<br>Soil:anaerobic sludge:potato waste:dextrose | 99.8 | 99.8 | 99.0 |
| 7 | 75:11.5:11.5:2<br>soil:cow manure:anaerobic sludge:corn starch | 99.7 | 96.3 | 41.3 |

EXAMPLE 3

This example shows the large scale application of the anaerobic bioremediation step of this invention to explosives contaminated soil in a portable container. Twelve tons of soil containing TNT, RDX, and HMX was combined with 3 tons of a mixture of cow manure and anaerobic sewage sludge, 150 kg of potato waste, and 150 kg of dextrose. The resulting soil and amendment mixture was placed into a steel container with dimensions of 20 feet long by 8 feet wide and 4 feet in height. Water was added to the soil and amendment mixture bringing the final moisture content of the mixture to 26 percent on weight basis. The top surface of the mixture was covered with a spray-on cover material and left undisturbed except for sample collection activities.

Soil samples were collected at the start of the study and in intervals of approximately three weeks thereafter. Soil samples were analyzed for explosives according to USEPA SW-846 Method 8330 by a laboratory certified to perform the analysis by the U.S. Army Corps of Engineers. The starting concentration of the contaminants of concern, namely TNT, RDX, and HMX were 720 mg/kg, 730 mg/kg, and 260 mg/kg, respectively. After 137 days of anaerobic treatment the levels of the principal contaminants were as follows: TNT=56 mg/kg (92% removed), RDX=86.5 mg/kg (88% removed), and HMX=68.3 mg/kg (68% removed). Additionally, the total concentration of the TNT metabolites ADNTs and DANTs was less than 14 mg/kg.

EXAMPLE 4

This example shows the application of the anaerobic step of the treatment process to the large scale remediation of explosives contaminated soil. Approximately 100 tons of soil contaminated with TNT, RDX, and HMX was combined with 15 tons of cow manure, 15 tons of anaerobic digester sludge, 1.3 tons of potato waste, and 1.3 tons of dextrose using a windrow turner. The resulting soil and amendment mixture was placed in a pit and water was added to increase the moisture content of the mixture to near saturation. The top surface of the mixture was covered with a spray-on cover material.

Figure 6:
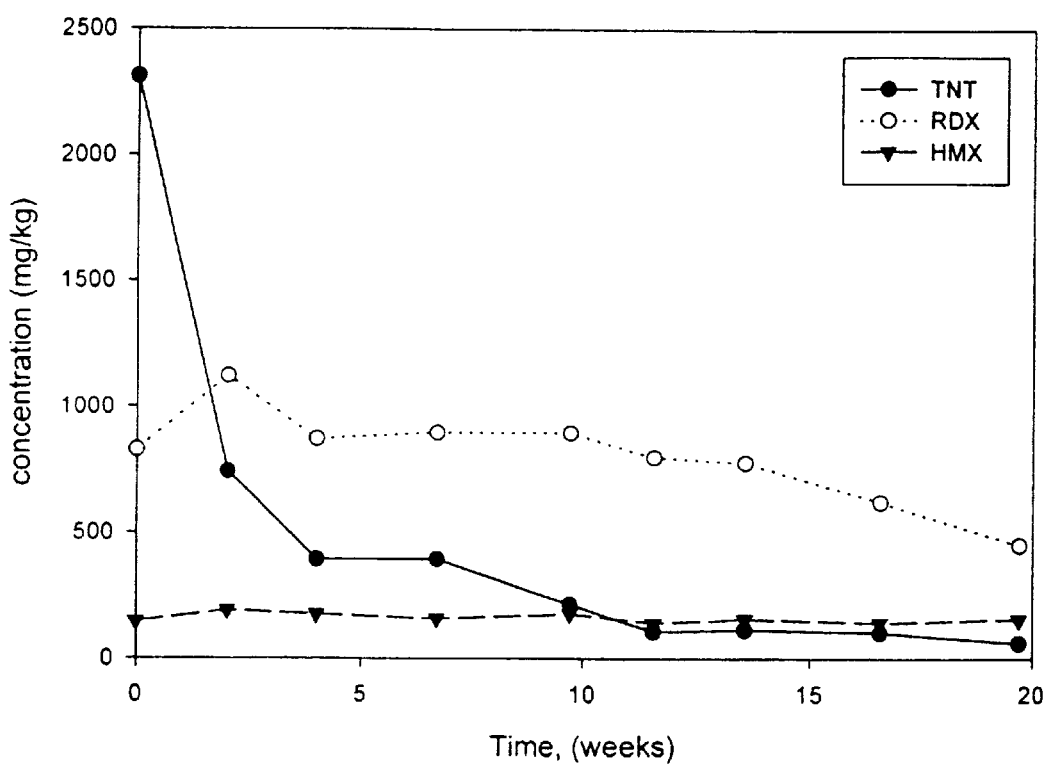
FIG. 6 is a plot of the concentration of TNT, RDX, and HMX versus time for the anaerobic phase described in Example 4.
Figure 7:
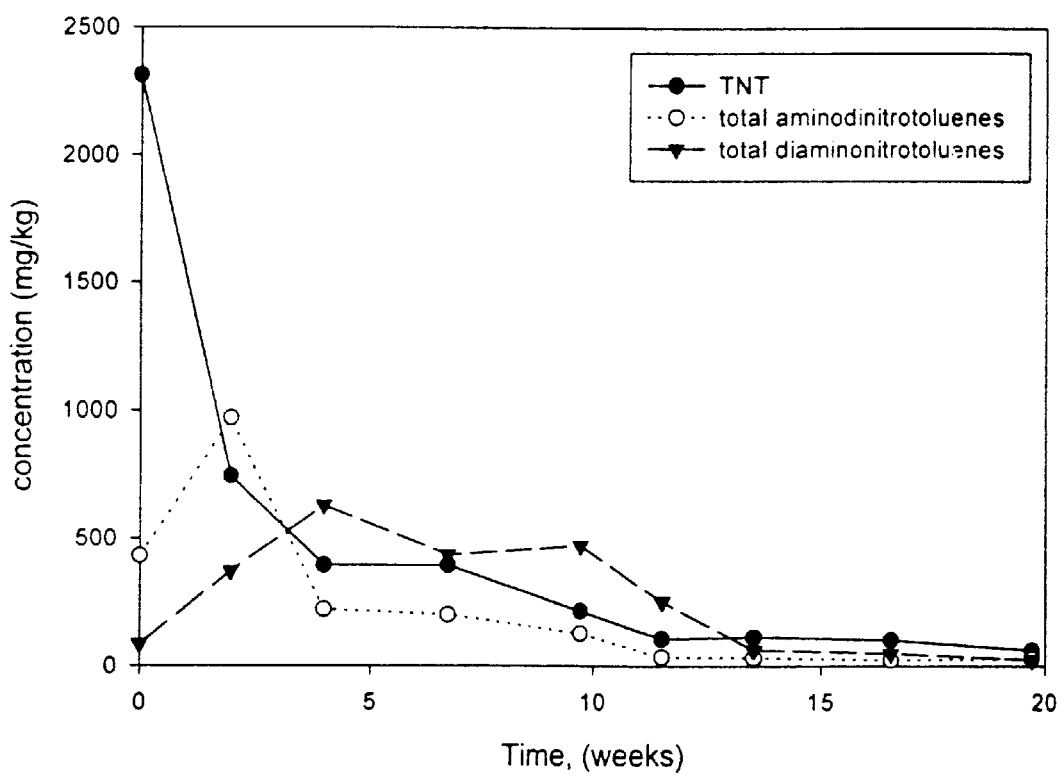
FIG. 7 is a plot of the concentration of TNT, monoaminonitrotoluene, and diaminonitrotoluene reduction products versus time during the anaerobic phase described in Example 4.

Soil samples were collected at the start of the study and in intervals of approximately three weeks thereafter. At each sampling period, one soil sample was collected for every five yards of material being treated. Soil samples were analyzed for explosives according to USEPA SW-846 Method 8330 by a laboratory certified to perform the analysis by the U.S. Army Corps of Engineers. The starting concentration of the contaminants was as follows: TNT= 2310 mg/kg, RDX=829 mg/kg, and HMX=146 mg/kg. The concentrations of TNT, RDX, and HMX in the soil during the anaerobic step of treatment are shown in FIG. 6. The concentrations of TNT and associated metabolites is shown FIG. 7. After 138 days of anaerobic treatment, the mean TNT concentration was 61 mg/kg (97% conversion) and the mean RDX concentration was 449 mg/kg (46% removed).

EXAMPLE 5

Figure 8:
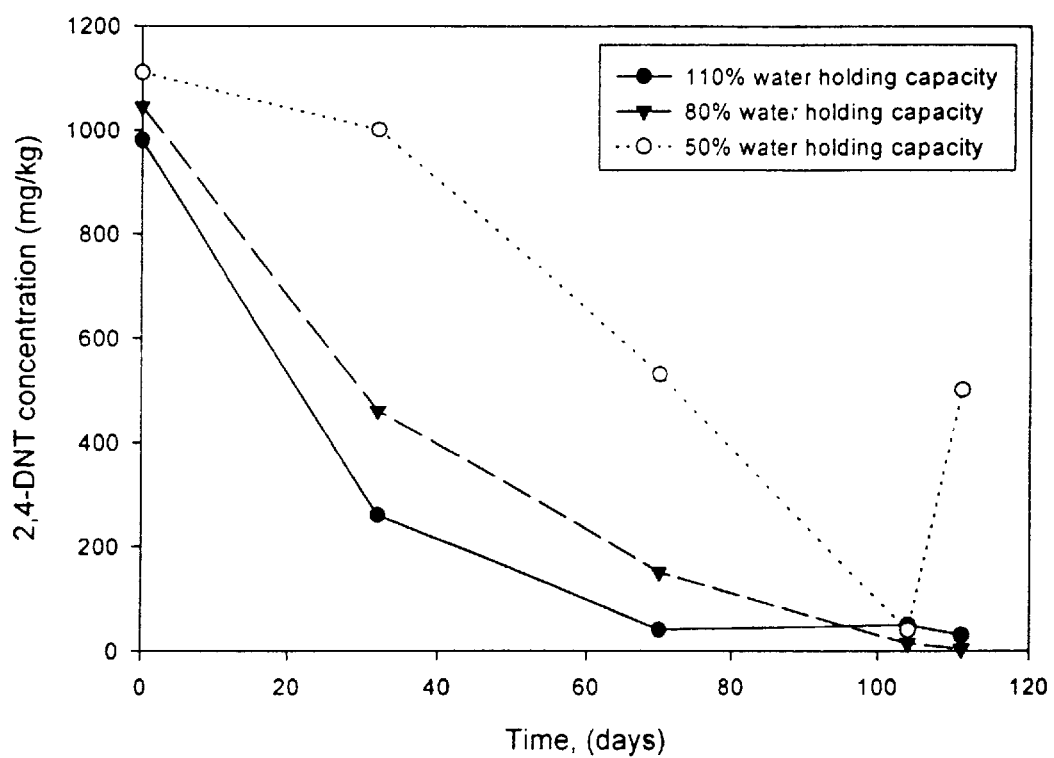
FIG. 8 is a plot of the concentration of 2,4-DNT versus time for the anaerobic phase of treatment under different moisture contents described in Example 5.

This example illustrates the effect of varying the moisture content of the anaerobic bioremediation mixture when applying the process to the treatment soil contaminated with 2,4-DNT. Three tests were performed in which the water content of the anaerobic bioremediation mixture was adjusted to 50, 80, and 110% of the water holding capacity of the mixture. Each test vessel contained approximately 200 kg of a mixture consisting of 75% (weight basis) 2,4-DNT contaminated soil, 23.5% of a blend of cow and horse manures and anaerobic digester sludge, and 1.5% starch. After adjusting the water content, the reactors were sealed and allowed to incubate for a period of 111 days. Soil samples were collected periodically from each reactor and analyzed for 2,4-DNT. The concentration of 2,4-DNT at the start of the incubation period was 1,074 mg/kg. FIG. 8 shows that the rate of 2,4-DNT degradation varied as a function of the water content of the anaerobic mixture, with higher moisture contents resulting in initially higher rates of removal. The extent of 2,4-DNT removal after 111 days, relative to the starting concentration, was 54.9, 99.5, and 96.9% for test mixtures having water contents of 50, 80, and 110% of water holding capacity, respectively.

EXAMPLE 6

A laboratory scale study was performed to evaluate the potential of the process of this invention to treat tetryl contaminated soil. Soil contaminated with tetryl was obtained from the Joliet Army Ammunition Plant in Illinois. Duplicate test reactors were setup to evaluate tetryl degradation for three mixtures containing the following percent weight ratios of soil:cow manure:starch:dextrose: 75:23:1:1, 98:0:1:1, and 100:0:0:0. Soil samples were collected from each test reactor at the start of the anaerobic incubation and again 14 and 28 days afterward. Table 6 shows tetryl analysis results obtained for these samples. After 14 days, the tetryl concentration in the test reactors containing soil amended with the microorganism and carbon source were below the cleanup criteria for tetryl (7,400 mg/kg).

TABLE 6

| | | Tetryl Concentration (mg/kg) Mixture Ratio (% weight) soil:cow manure:starch:dextrose | | | | | |
|---|---|---|---|---|---|---|---|
| | | 75:23:1:1 | | 98:0:1:1 | | 100:0:0:0 | |
| Time (days) | Test No. | 1 | 2 | 3 | 4 | 5 | 6 |
| 0 | | 12,300 | 12,400 | 12,000 | 9,614 | 9,921 | 10,000 |
| 14 | | 5,364 | 6,732 | 10,300 | 11,000 | 10,000 | 11,700 |
| 28 | | 8,030 | 5,951 | 10,300 | 10,400 | 12,000 | 9,799 |

The results from Table 6 indicate that the anaerobic bioremediation step of this invention is capable of significantly reducing the tetryl concentration of tetryl contaminated soils.

What I claim is:

1. A process for remediating explosives contaminated soil comprising the steps of:
   (a) maintaining an anaerobic bioremediation mixture comprising explosives contaminated soil, at least one natural microorganism source, and at least one oxidizable carbon source under anaerobic conditions for a period of time sufficient to convert at least a portion of the explosives contaminants into reduced derivative compounds to give an anaerobic bioremediation product;
   (b) preparing an aerobic bioremediation mixture by combining the anaerobic bioremediation product with at least one compostable material; and
   (c) maintaining the aerobic bioremediation mixture under aerobic conditions for a period of time sufficient to give a remediated soil product in which at least some of the reduced derivatives compounds have been converted into humic compounds.

2. The process of claim 1 wherein the remediated soil is site specific soil.

3. The process of claim 1 wherein the remediated soil is unrestricted soil.

4. The process of claim 1 wherein the weight of explosives contaminants in the remediated soil is at least 90% less than the weight of the explosives contaminants found in the explosives contaminated soil.

5. The process of claim 1 wherein the anaerobic bioremediation mixture includes from about 5% to about 50% by weight of a natural microorganism source.

6. The process of claim 1 wherein the natural microorganism source is selected from animal manure, anaerobic digester sludge, or mixtures thereof.

7. The process of claim 1 wherein the anaerobic bioremediation mixture is maintained at a moisture level of from about 50% to about 100% of the mixture's water holding capacity.

8. The process of claim 1 wherein the anaerobic bioremediation mixture includes from about 0.5 to about 5 weight percent of an oxidizable carbon source.

9. The process of claim 1 wherein the oxidizable carbon source is selected from purified carbohydrates, naturally carbohydrates, starches derived from agricultural products, and starch containing agricultural products.

10. The process of claim 1 wherein the oxidizable carbon source is from about 1.0% to about 2.0% by weight dextrose.

11. The process of claim 1 wherein the compostable material is selected from grass clippings, yard waste, municipal solid waste, landfill compostable materials, and mixtures thereof.

12. The process of claim 1 wherein the aerobic bioremediation mixture includes from about 33% to about 75% by volume of at least one compostable material.

13. The process of claim 1 wherein anaerobic bioremediation step (a) occurs in a vessel.

14. A process for remediating explosives contaminated soil comprising the steps of:
   (a) preparing an anaerobic bioremediation mixture comprising from about 50% to about 90% by weight explosives contaminated soil, from about 5% to about 50% by weight of at least one natural microorganism source, and from about 0.5 to about 5.0 weight percent of at least one oxidizable carbon source.

* * * * *